(12) United States Patent
Endres et al.

(10) Patent No.: US 8,973,870 B2
(45) Date of Patent: Mar. 10, 2015

(54) WALL COMPONENT FOR AN AIRCRAFT

(75) Inventors: Gregor Christian Endres, Pfaffenhofen (DE); Hans-Juergen Weber, Verden (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/611,077

(22) Filed: Sep. 12, 2012

(65) Prior Publication Data
US 2013/0032670 A1 Feb. 7, 2013

Related U.S. Application Data

(63) Continuation of application No. PCT/DE2011/000311, filed on Mar. 24, 2011.

(30) Foreign Application Priority Data

Mar. 30, 2010 (DE) .......................... 10 2010 013 370

(51) Int. Cl.
*B64C 1/00* (2006.01)
*B64C 1/06* (2006.01)
*B64C 1/18* (2006.01)

(52) U.S. Cl.
CPC . *B64C 1/068* (2013.01); *B64C 1/18* (2013.01); *B64C 2001/0072* (2013.01); *Y02T 50/433* (2013.01); *Y02T 50/43* (2013.01)
USPC .......................................... 244/120; 244/131

(58) Field of Classification Search
USPC .................. 244/119, 120, 129.1, 131, 132
See application file for complete search history.

(56) References Cited

U.S. PATENT DOCUMENTS

| 3,155,348 A * | 11/1964 | Ricard .......................... 244/119 |
| 8,215,584 B2 | 7/2012 | Cazeneuve et al. |
| 2006/0248854 A1 | 11/2006 | Bartley-Cho et al. |

FOREIGN PATENT DOCUMENTS

JP 2006281664 A 10/2006

OTHER PUBLICATIONS

International Searching Authority, International Search Report dated Nov. 11, 2011 for International Application No. PCT/DE2011/000311.
German Patent Office, German Office Action dated Oct. 12, 2012 for German Patent Application No. 1020100133701.

* cited by examiner

*Primary Examiner* — Brian M O'Hara
*Assistant Examiner* — Michael Kreiner
(74) *Attorney, Agent, or Firm* — Ingrassia Fisher & Lorenz PC

(57) ABSTRACT

The present disclosure relates to a wall component for an aircraft for forming an outer wall comprising at least one first wall element, at least one second wall element and at least one connecting device for connecting the first wall element to the second wall element. On wall regions that are to be directed towards each other, the first and the second wall element comprise connecting regions. Furthermore, a joint element is provided, which comprises a joint region with a joint region surface that is to be arranged towards the outside of the aircraft, wherein the joint region is designed to be received with a matching fit into a recess formed by the connecting regions of the wall elements, and wherein the joint region surface, when the joint element is inserted, is flush with the outer surfaces of the wall elements.

17 Claims, 2 Drawing Sheets

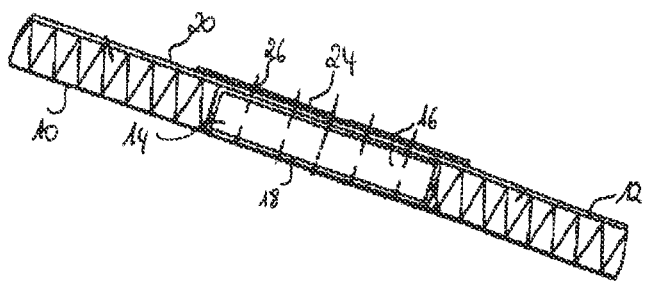
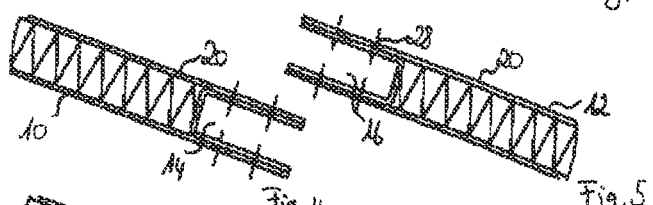
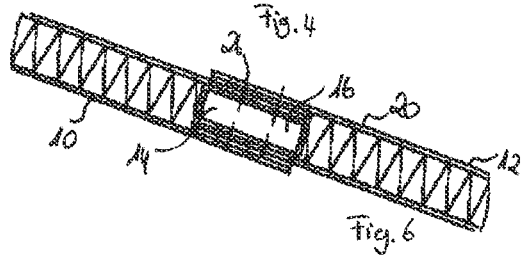
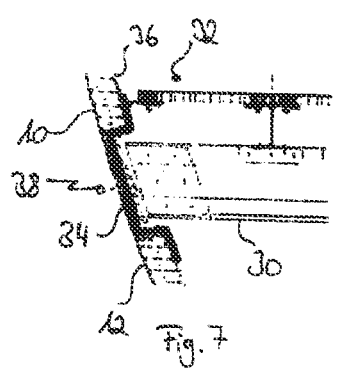
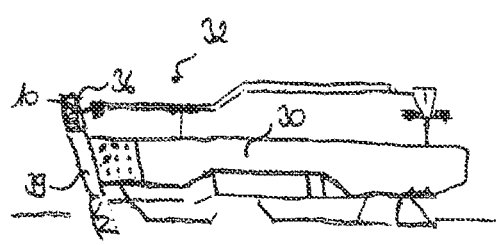

WALL COMPONENT FOR AN AIRCRAFT

CROSS-REFERENCE TO RELATED APPLICATIONS

This is a continuation of International Application No. PCT/DE2011/000311, filed Mar. 24, 2011, which application claims priority to German Application No. 10 2010 013 370.1, filed Mar. 30, 2010, which are hereby incorporated by reference in their entirety.

TECHNICAL FIELD

The technical field pertains to a wall component for an aircraft for forming an outer wall, comprising at least one first wall element, at least one second wall element and at least one connecting device for connecting the first wall element to the second wall element. The present disclosure furthermore pertains to an aircraft fuselage with such a wall component and a method for connecting the wall elements, as well as a method for the installation of an interior furnishing element on the aircraft fuselage.

BACKGROUND

In an aircraft such as, for example, an airplane, the fuselage is one of the large primary structural components in addition to the wings. With the exception of a few sections, it comprises a simple tube with largely constant diameter.

In aircraft, such as large-capacity aircraft, that are nowadays in use, only metallic composite materials are installed in the fuselage. In this case, the individual fuselage cells are assembled of preformed shells. The joining of the fuselage shells is realized with rivets. Reinforcing devices (frames) and devices for connecting the reinforcing devices (stringers) are arranged on the inner side of the fuselage by means of bonding and/or riveting for reinforcement purposes.

According to current trends, composite materials, such as composite fiber materials, will in the future be used as primary structure in a fuselage. These materials generally include two main components, namely an embedding matrix and reinforcing fibers. Composite fiber materials have a high specific strength, i.e., a high strength-to-weight ratio. Components including these materials therefore weigh less, but still have the same or even better properties than the corresponding metallic materials used so far.

Composite fiber material provides the advantage of having a high specific strength, i.e., a high strength and simultaneously a very low weight. Composite fiber materials significantly differ from metals in various aspects:

Fiber composites comprise different layers that are built up into a composite either in a lamination process (prepreg) or in an infusion process. In this case, more or less intense setting processes occur during the curing of the composites and result in a change in the thickness, as well as a shift of the layers relative to one another in curved components.

The properties of fiber composites result, among other things, from a largely undisturbed fiber structure. This means that fiber interruptions need to be minimized in order to optimally utilize the material properties.

Depending on the materials (textiles, prepregs) and processing methods used, very elaborate tools and time-consuming manufacturing processes are required.

The processing of composite fiber material components is very cost-intensive due to the required tools.

In contrast to a metallic skin panel, the layered structure may delaminate from outside under stress such that elaborate repairs are required.

Due to the light weight and the force paths that can be adapted in a customized fashion, however, composite fiber material may be the material of choice in future aircraft construction.

In the preparation of new cost-efficient manufacturing and installation concepts, the overall concept should be realized specific to the material. In addition, the process reliability of manufacturing processes for (large) components should be ensured. The repair of defective components not only involves high costs. The manufacturing processes, in particular, in the field of composite materials are relatively time-consuming Depending on the production figures, defective components or rejects need to be taken into consideration such that no production delays occur. Depending on the component and the structural size, this may require significant additional financial expenditures. The concept for the final assembly of all components should be simple, particularly for a large-scale manufacture, because a large portion of the overall manufacturing time is scheduled for the final assembly.

The first aircraft with a fuselage of composite fiber material, namely the Boeing 787, is composed of several wound fuselage cells that are manufactured in one piece in a winding process without fiber interruption. These fuselage cells are then assembled. In this type of manufacture, the tool used includes an elaborate internal core. This method is excellent with respect to the fiber structure because no interruptions are necessary.

However, there also are two disadvantages. On the one hand, an aircraft requires a very dimensionally accurate external geometry in order to not disturb the aerodynamics of the surface. An internal tool would be ideal for this purpose. However, this is not possible in winding processes such that other elaborate methods are used during the curing process in order to ensure the dimensional accuracy of the skin. In addition, the fibers inevitably become longer as the number of layers increases. During a setting process as it occurs during the curing of composite fiber materials, this may lead to a fiber surplus in the outer layers. Consequently, undulations may be created in the fiber layers.

When an internal tool is used, the skin is dimensionally accurate. However, this is associated with the problem that the inner fiber layers (i.e., the fiber layers toward the fuselage center) become shorter in a self-contained fuselage cell. These inner fiber layers cannot set when they are thermally acted upon and may lead to manufacturing concerns. Both approaches, namely with an internal tool, as well as with an external tool, are optimal with respect to the fiber processing because no fiber interruptions exist, but can lead to the above-described problems. In addition, other objects, desirable features and characteristics will become apparent from the subsequent summary and detailed description, and the appended claims, taken in conjunction with the accompanying drawings and this background.

SUMMARY

In an aircraft, the aerodynamics of the surface are generally important. To this end, the external geometry of the fuselage should be very dimensionally accurate, i.e., the actual dimension should lie within a very narrow tolerance of the nominal dimension. On wound fuselage cells, it is very complicated and expensive to obtain a dimensionally accurate external geometry.

Consequently, a completely different approach for manufacturing an aircraft fuselage of composite fiber materials was chosen, for example, in the Airbus A350 XWB. In this case, the fuselage is not manufactured in a winding process, but shells are produced and connected to one another by means of rivets inserted into bores. However, the bores required for this connection may need to be elaborately produced in the shell components during the manufacture.

In the above example, the fuselage is assembled of individual shells. These shells can be manufactured with high reliability because they are not self-contained. However, the construction technique is less specific to the material and the complexity of the assembly is comparable to that of metals. A large number of rivets are also used for the joining process in this case. The bores required for these rivets may need to be elaborately produced during the manufacture.

The concept of a double-shell structure therefore makes it possible to simplify the manufacture and assembly. In this case, the outer skin is flatly supported by a light and high core structure and a second skin is applied on the rear side. Examples of such a structure are illustrated in FIG. 3 to FIG. 8. It is possible to replace a plurality of shells with a few large segments.

In this case, the connection of the segments is primarily realized in the longitudinal direction of the fuselage such that longitudinal seams are created. In design and development, various approaches for connecting the segments to one another are discussed.

FIG. 3 shows a first discussed approach for connecting two segments to one another. In this case, a first segment 10 and a second segment 12 are realized in the form of U-profiles with recesses 14, 16. A solid profile 18 is inserted into the recesses 14, 16 of the U-profiles in order to produce the connection. The first segment 10 and the second segment 12 are connected to one another by mounting the solid profile 18 on a connecting element 24 placed on the outer skin 20 of the segments 10, 12 by means of rivets 26. An overlap of the two segments 10, 12 to be connected to one another is avoided.

FIGS. 4 to 6 show a second discussed approach for connecting the first segment 10 in FIG. 2 to the second segment 12 in FIG. 3. The two segments 10, 12 to be connected are inserted into one another and connected by means of rivets 26 at rivet bores 28 that lie on top of one another. This insertion into one another may lead to an external unevenness that may be associated with aerodynamic disadvantages. For reasons of comparison, the external profile of FIG. 3 is once again shown in addition to FIG. 6 in order to illustrate that the skin 20 in the approach according to FIG. 3 does not feature any elevations while a step is formed in the skin 20 in the approach according to FIG. 6.

Furthermore, additional mountings 34 may need to be attached to the inner skin 36 in order to mount, for example, floor frames 30 in the interior 32 of the fuselage. This is illustrated in FIG. 7 and FIG. 8. The mountings 34 either are fixed on the fuselage directly at the connecting point 38 between the segments 10, 12 as shown in FIG. 7 or the segments 10, 12 feature recesses 39 at the corresponding locations and mountings 34 can be inserted into these recesses in order to mount the floor frame 30 thereon as shown in FIG. 8.

However, all these solutions may weaken the composite fiber material and simultaneously lead to a complicated and expensive assembly process.

According to various exemplary embodiments, it can be desirable to develop a wall component for an aircraft that is manufactured of composite fiber material and has a high dimensional accuracy, wherein the composite fiber material of the wall component is not weakened, but still allows a simple and cost-efficient manufacture and assembly.

Further provided according to various exemplary embodiments is a method for connecting wall elements of composite fiber material in order to form a wall component forms the subject-matter of the other independent claim.

The present disclosure provides a wall component for an aircraft for forming an outer wall that comprises at least one first wall element, at least one second wall element and at least one connecting device for connecting the first wall element to the second wall element. The first wall element can include a composite fiber material and has a first outer wall region and a first connecting region, wherein the first outer wall region is provided with a first outer surface in order to form a surface area of the outer wall, and the first connecting region is arranged on an edge region of the first wall element and realized such that it is set back relative to the first outer surface. The second wall element has a second outer wall region and a second connecting region, and the second outer wall region is provided with a second outer surface in order to form a surface area of the outer wall. The second connecting region can be arranged on an edge region of the second wall element and realized such that it is set back relative to the second outer surface, and the connecting regions are designed for connecting the wall elements to one another on the edge regions to be directed toward one another and set back relative to the outer surfaces that serve for forming the outer wall in such a way that a depression is created when the first and the second wall element are arranged adjacent to one another such that their connecting regions are directed toward one another. The connecting device features a one-piece joint element with a joint region for connecting the first connecting region to the second connecting region, and the joint region is designed for being accommodated in the depression in a fitted fashion such that an outer joint region surface of the joint region designed for forming the outer wall of the aircraft at the joint between the first and the second wall element is arranged flush with the first outer surface, as well as the second outer surface, when the joint region is inserted into the depression.

If the wall component features several wall elements instead of being realized in one piece, it is much easier to manufacture the wall component of composite fiber material because a dimensionally accurate external geometry of the wall elements can already be achieved during the manufacture without requiring other elaborate methods for realizing the dimensional accuracy of the outer wall.

The first and the second wall element preferably are realized symmetrical to one another.

In addition, according to various exemplary embodiments provided is a joint element for connecting the two wall elements to one another, wherein this joint element features a joint region that is designed for being accommodated in the depression in a fitted fashion. In this way, the connecting regions of the connecting device are on the one hand connected to one another and the created depression is on the other hand filled out. The formation of turbulences in the region of the connecting device is therefore prevented. An outer joint region surface is advantageously arranged on the joint region and arranged flush with the first outer surface of the first wall element, as well as the second outer surface of the second wall element, when the joint element or the joint region is respectively inserted into the depression formed by the two connecting regions. A smooth surface is advantageously created on the outer skin of the aircraft and negative influences on the aerodynamics of the aircraft can be reduced.

Further, according to various exemplary embodiments, provided is an oblique first ramp that connects the first outer surface to the first connecting region between the first outer surface and the first connecting region. Analogously, also provided according to various exemplary embodiments is an oblique second ramp on the second wall element between the second outer surface and the second connecting region. Since the two ramps are realized obliquely, it is possible to insert the joint element into the depression formed by the first and the second connecting region and to maintain any apertures created during this process as narrow as possible. The joint element can be inserted into the depression without major problems and aligns itself in the depression.

The first wall element and the second wall element are advantageously realized symmetrical to one another. This simplifies the calculation of the connecting region parameters.

The joint element can be is realized complementary to the first ramp and to the first connecting region on a first edge region and complementary to the second ramp and to the second connecting region on a second edge region. Due to such a design, the joint element can line up exactly with the depression formed by the two connecting regions and the two ramps and in this way makes it possible to produce a generally tight connection between the two wall elements. The outer skin of the aircraft is practically unaffected and the aerodynamics are hardly disturbed by the connection between the wall elements.

In one of various exemplary embodiments, the two wall elements have a double-shell design and respectively feature a first and a second inner wall region, wherein a supporting core structure is arranged between the outer wall regions and the inner wall regions. Double-shell wall elements significantly simplify the manufacture and assembly because the shells only need to be dimensionally accurate on one side. The double-shell design preferably replaces stringers and frames entirely and makes it possible to reduce the labor input.

In order to achieve a generally simple and solid manufacture of the wall elements, the outer wall regions and the inner wall regions are baked together and/or interwoven specific to the force flow on the connecting regions in order to thusly form a one-piece connecting region. A correspondingly realized connecting region has a very high strength and therefore is generally suitable for connecting the two wall elements.

In another of various exemplary embodiments, provided is an oblique inner ramp for connecting the connecting regions to the inner wall regions on each wall element. Due to the arrangement of the inner ramps, the connecting regions are shifted farther toward the outer surface of the wall elements and the joint region of the joint element can be realized smaller such that the material input and the costs can be reduced. The arrangement of a double ramp with inner and outer ramps leads to a generally inflexible and solid profile and to a rigid connection of the connecting region to the remaining double-shell region of the wall element. The double-shell region is generally structured in the form of a sandwich construction and therefore ends in a monolithic region.

In one exemplary embodiment, the joint element can be manufactured in one piece in accordance with the pultrusion technique. This technique makes it possible to easily and cost-efficiently manufacture components. Furthermore, the joint element can also be manufactured of fiber-reinforced plastic materials in this way in order to simultaneously achieve a low weight and a high strength.

In one of various exemplary embodiments, the joint element features a flange adjacent to the joint region, wherein this flange extends away from the joint region in a projecting fashion on the opposite side of the outer joint region surface.

The joint element may also feature several flanges that extend away from the joint region in a projecting fashion on the opposite side of the outer joint region surface. The flange or the flanges can be used for mounting interior structures. Consequently, interior structures easily can be rigidly connected, e.g., to the outer fuselage structure, wherein a floor support may, e.g., be mounted in the interior of the aircraft fuselage on a flange. Other mounting devices on the wall elements therefore are not required and the structure of the composite fiber materials is not weakened, for example, by bores for rivets or recesses for other mounting elements. If the joint element features several flanges, they can form a receptacle space between one another such that, for example, antenna systems can be easily installed therein. It is also possible to mount cable harnesses on or between the flanges. In order to realize a generally simple assembly, it would be possible to already mount, for example, such antenna systems or cable harnesses on the joint element prior to connecting the two wall elements. In this way, the subsequent work can be reduced.

An aircraft generally features the described wall component, wherein its wall elements are connected to the joint elements along longitudinal seams that extend in the longitudinal direction of the aircraft fuselage. This aircraft therefore has a surface, on which the aerodynamics are not influenced or only slightly influenced by the connection between the wall elements.

If a floor support or a floor structure is advantageously mounted on the inwardly extending flanges of two opposing joint elements, it is not necessary to provide any additional mounting devices on the aircraft fuselage and the respective structure of the wall elements or the fuselage is not weakened.

A method for connecting wall elements that are manufactured of composite fiber material and form an outer wall of an aircraft due to the connection features the following:

forming edge regions on a first and a second wall element in the form of respective first and second connecting regions such that the connecting regions are set back relative to the outer surfaces of the two wall elements that form the outer wall;

aligning the two connecting regions relative to one another such that a depression that is set back relative to the two outer surfaces of the wall elements is formed at the joint between the wall elements to be connected;

providing a one-piece joint element with a joint region that fits into the depression in such a way that an outer joint region surface formed at the joint is arranged flush with the outer surfaces of the wall elements when the joint region is inserted into the depression; and mounting the two connecting regions on the joint region.

Such a method advantageously makes it possible to form an outer surface of an aircraft that does not feature any elevations or depressions that could disturb the aerodynamics of the aircraft. The structure of the composite fiber materials, of which the wall elements are manufactured, furthermore may not be weakened due to the connection of only the joint region of the joint element to the connecting regions of the wall elements.

During the formation of the edge regions of the wall elements, the connecting region can be formed in such a way that it is also set back relative to an inner surface of the wall elements that form the inner wall.

In this way, the connecting regions are shifted farther toward the outer surface of the aircraft and the joint region of the joint element can be realized narrow in order to save material.

If the formation of the edge regions of the wall elements advantageously also comprises baking together or interweaving the outer walls and the inner walls, a connecting region with a generally high strength and stability is created on each wall element.

In a method for the installation of an interior furnishing element on a region of the fuselage of the aircraft, the fuselage of the aircraft advantageously is initially manufactured in accordance with the above-described method. It is furthermore advantageous to either provide a flange that extends away from the joint region and on which an interior furnishing element in the form of a floor structure is mounted on the opposite side of the outer joint region surface or to provide at least two flanges that form an intermediate space between one another, in which systems such as, for example, antenna systems can be installed. It is furthermore generally desirable to mount cable harnesses on the flanges.

Due to the arrangement of the flanges, it is no longer necessary to provide the wall elements with additional holding devices for the floor structure, as well as for the antenna systems and cable harnesses. Such additional devices could weaken the fiber composite structure, but this can be prevented by providing the flanges on the joint element.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 3 shows a first wall element according to another connecting technique for explanatory purposes only;

FIG. 4 shows a first wall element with a U-shape according to another connecting technique for explanatory purposes only;

FIG. 5 shows a second wall element with a U-shape according to another connecting technique for explanatory purposes only;

FIG. 6 shows a second wall element according to another connecting technique for explanatory purposes only;

FIG. 7 shows a third wall element according to another connecting technique for explanatory purposes only; and FIG. 8 shows a fourth wall element according to another connecting technique for explanatory purposes only.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
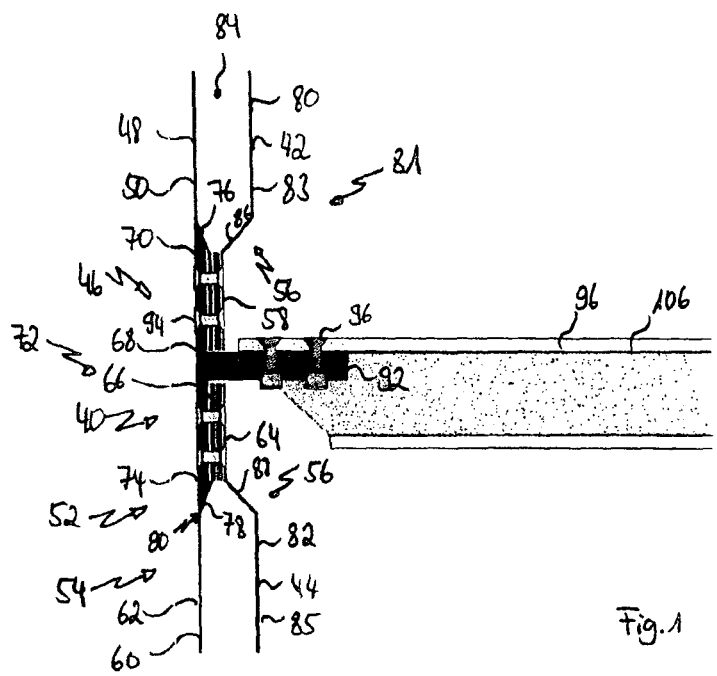
FIG. 1 shows a first embodiment of a wall component with two wall elements and a connecting device.
Figure 2:
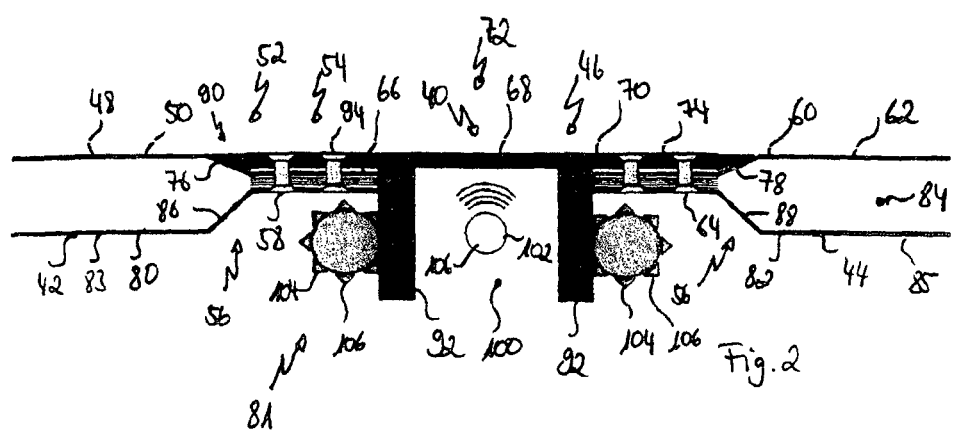
FIG. 2 shows a second embodiment of a wall component with two wall elements and a connecting device.

The double-shell concept makes it possible to significantly simplify the manufacture and assembly of an aircraft. In this case, an outer skin is flatly supported by a light and high core structure and a second skin is applied on the rear side. FIG. 1 and FIG. 2 show how such double-shell wall elements can be connected to one another.

FIG. 1 shows a wall component 40 of a not-shown aircraft with a first wall element 42 of composite fiber material, a second wall element 44 of composite fiber material and a connecting device 46.

The first wall element 42 features a first outer wall region 48 with a first outer surface 50. The first outer surface 50 forms a surface area 52 of an outer wall 54 of the aircraft. The first wall element 42 furthermore features a first connecting region 58 on an edge region 56.

The second wall element 44 is realized symmetrical to the first wall element 42 and accordingly features a second outer wall region 60 with a second outer surface 62, as well as a second connecting region 64 on an edge region 56. The connecting device 46 is formed by the connecting regions 58, 64 and a joint element 68. The first connecting region 58 is arranged such that it is set back relative to the first outer surface 50 and the second connecting region 64 is likewise arranged such that it is set back relative to the second outer surface 62. The two wall elements 44, 46 are arranged adjacent to one another such that their connecting regions 58, 64 lie on edge regions 56 that are directed toward one another and thusly form a depression 66.

The wall components respectively feature oblique ramps 76, 78 that connect the outer surfaces 50, 62 to the connecting regions 58, 64.

Since the two wall elements 42, 44 are realized symmetrical to one another, the oblique ramps 76, 78 have the same angle relative to the outer surfaces 50, 62.

The connecting device 46 features the joint element 68 with a joint region 70 in the depression 66. The joint region 70 is realized in such a way that it can be accommodated in the depression 66 in a fitted fashion. It lines up flush with the first outer surface 50 and the second outer surface 62 such that the outer wall 54 of the aircraft extends smoothly and without projections at the joint 72. An outer joint region surface 74 of the joint region 70 therefore lines up exactly with the first outer surface 50 and the second outer surface 62.

The two wall elements 42, 44 have a double-shell design and respectively feature an inner wall region 80, 82. A supporting core structure 84 is arranged in the two wall elements 42, 44 between the inner wall regions 80, 82 and the outer wall regions 48, 60.

Oblique inner ramps 86, 88 connect the connecting regions 58, 64 to the inner wall regions 80, 82 that respectively feature an inner surface 83, 85 that forms an inner wall 81. At the connecting regions 58, 64, the outer wall regions 48, 60 and the inner wall regions 80, 82 are either baked together and/or interwoven specific to the force flow in order to thusly form one-piece connecting regions 58, 64.

On the edge regions 90, the joint element 68 is realized complementary to the oblique ramps 76, 78 and to the connecting regions 58, 64. It features a flange 92 that extends away from the joint region 70 in a projecting fashion opposite of the joint region surface 74. The flange 92 and the joint region 70 of the joint element 68 are manufactured in one piece in accordance with the pultrusion technique.

A floor structure 96 is mounted on the flange 92 with the aid of mounting means 94.

The joint element 68 connects the first wall element 42 to the second wall element 44 with the aid of mounting means 98. Rivets, bolts, screws or the like may be used as mounting means 94, 98.

FIG. 2 shows a second exemplary embodiment of the connecting device 46 according to FIG. 1. In this case, the wall elements 42, 44 are connected by means of a joint element 68 that features two flanges 92. A receptacle space 100 is formed between the two flanges 92, wherein systems, in this case antenna systems 102, are accommodated in this receptacle space. Cable harnesses 104 extend laterally of the flanges 92. The floor structure 96, the antenna system 102 and the cable harnesses 104 represent interior furnishing elements 106 of the aircraft.

The connecting device 46 according to the exemplary embodiments in FIGS. 1 and 2 consequently features a multifunctional joint element 68 that makes it possible to easily realize a perfect aerodynamic outer skin of an aircraft, in which the wall elements 42, 44 are realized symmetrical in order to simplify the calculations and mountings in the form of the flanges 92 are simultaneously provided for the inner fuselage region. The two double-shell wall elements 44, 46 transform into a one-piece connecting region 58, 60 via oblique ramps 76, 78 and oblique inner ramps 86, 88, i.e., via a double ramp. If a T-profile is used as joint element 68 in the connecting device 46, the flange 92 is directed toward the inner side of the fuselage. Such T-profiles can be cost-efficiently manufactured in the form of straight pultrusion profiles. If they are mechanically designed accordingly, the flange in the fuselage interior can be used for the installation of floor structures 96.

The joint element 68 may alternatively feature two flanges 92. In this case, cable harnesses 104 and antenna systems 102 already may be externally positioned and prepared, for example, in the region of the apex on the upper side of the fuselage prior to the fuselage assembly such that the subsequent work is reduced.

Such a design of the joints 72 significantly reduces the manufacturing effort and the costs due to the elimination of additional mountings.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A wall component for an aircraft for forming an outer wall, comprising:
    at least one first wall element including a composite fiber material and having a first outer wall region and a first connecting region, the first outer wall region provided with a first outer surface in order to form a first surface area of the outer wall, and the first connecting region arranged on an edge region of the first wall element and configured such that it is set back relative to the first outer surface;
    at least one second wall element having a second outer wall region and a second connecting region, the second outer wall region provided with a second outer surface in order to form a second surface area of the outer wall, the second connecting region arranged on an edge region of the second wall element and configured such that it is set back relative to the second outer surface; and
    at least one connecting device for connecting the first wall element to the second wall element, the at least one connecting device including a one-piece joint element with a joint region for connecting the first connecting region to the second connecting region, the one-piece joint element further comprising a flange extending into a fuselage orthogonal to the first and second wall element,
    wherein the flange is configured to support an interior structure, and
    wherein the first connecting region and second connecting region are designed for connecting the at least one first wall element and at least one second wall element to one another on the edge regions to be directed toward one another and set back relative to the outer surfaces that serve for forming the outer wall in such a way that a depression is created when the first wall element and the second wall element are arranged adjacent to one another such that their connecting regions are directed toward one another, and the joint region is accommodated in the depression in a fitted fashion such that an outer joint region surface of the joint region forms the outer wall of the aircraft at the joint between the first and the second wall element and is arranged flush with the first outer surface, as well as the second outer surface, when the joint region is inserted into the depression.

2. The wall component of claim 1, wherein an oblique first ramp for connecting the first outer surface to the first connecting region is provided between the first outer surface and the first connecting region, and wherein an oblique second ramp for connecting the second outer surface to the second connecting region is provided between the second outer surface and the second connecting region.

3. The wall component of claim 2, wherein the joint element is configured complementary to the first ramp and to the first connecting region on a first edge region and configured complementary to the second ramp and to the second connecting region on a second edge region.

4. The wall component of one claim 1, wherein the first wall element and the second wall element are configured symmetrical to one another.

5. The wall component of one of claim 1, wherein the first wall element has a double-shell design and comprises at least one first inner wall region and the second wall element has a double-shell design and comprises a second inner wall region, and wherein a supporting core structure is respectively arranged between the first outer wall region and the first inner wall region and between the second outer wall region and the second inner wall region.

6. The wall component of claim 5, wherein the first outer wall region and the first inner wall region are at least one of baked together or interwoven specific to the force flow on the first connecting region in order to realize the first connecting region in one piece, and wherein the second outer wall region and the second inner wall region are at least one of baked together or interwoven specific to the force flow on the second connecting region in order to realize the second connecting region in one piece.

7. The wall component of claim 5, wherein an oblique first inner ramp is provided for connecting the first connecting region to the first inner wall region, and wherein an oblique second inner ramp is provided for connecting the second connecting region to the second inner wall region.

8. The wall component of claim 1, wherein the joint element is configured in one piece in accordance with pultrusion technique.

9. The wall component of claim 1, wherein the joint element comprises the joint region.

10. The wall component of claim 1, wherein the joint element comprises several flanges that extend away from the joint region in a projecting fashion on the opposite side of the outer joint region surface in order to form a receptacle space between one another.

11. A method for connecting wall elements of composite fiber material in order to form an area of an outer wall of an aircraft, comprising:

forming an edge region of a first wall element in the form of a first connecting region such that the first connecting region is set back relative to a first outer surface that forms the outer wall, forming an edge region of a second wall element in the form of a second connecting region such that the second connecting region is set back relative to a second outer surface that forms the outer wall;

aligning the first and the second connecting regions relative to one another such that a depression that is set back relative to the first outer surface and the second outer surface is formed at the joint between the wall elements to be connected;

providing a one-piece joint element with a joint region that fits into the depression in such a way that an outer joint region surface configured for forming the outer wall region of the aircraft at the joint is arranged flush with the first outer surface and the second outer surface when the joint region is inserted into the depression, the one-piece joint element further comprising a flange extending into a fuselage orthogonal to the first and second wall element, and the flange is configured to support an interior structure; and mounting the first connecting region and the second connecting region on the joint region.

12. The method of claim 11, wherein forming the edge region of the first wall element further comprises:

forming the edge region of the first wall element in the form of a first connecting region such that the first connecting region is set back relative to a first inner surface that forms the inner wall.

13. The method of claim 12, wherein forming the edge region of the second wall element further comprises:

forming the edge region of the second wall element in the form of a second connecting region such that the second connecting region is set back relative to a second inner surface that forms the inner wall.

14. The method of claim 13, further comprising:
baking together or interweaving the second outer wall region with the second inner surface.

15. The method of claim 12, further comprising:
baking together or interweaving the first outer wall region with the first inner surface.

16. The method of claim 11, further comprising:
providing at least two flanges that extend orthogonally to the joint region on the opposite side of the outer joint region surface; and
mounting systems in a receptacle space formed between the two flanges.

17. The method of claim 16, further comprising:
mounting cable harnesses on the two flanges.

* * * * *